March 7, 1939.  M. SAUPE  2,149,791

MACHINE TOOL

Filed Aug. 6, 1937  6 Sheets-Sheet 1

Inventor: Max Saupe by Karl Viertel

Attorney

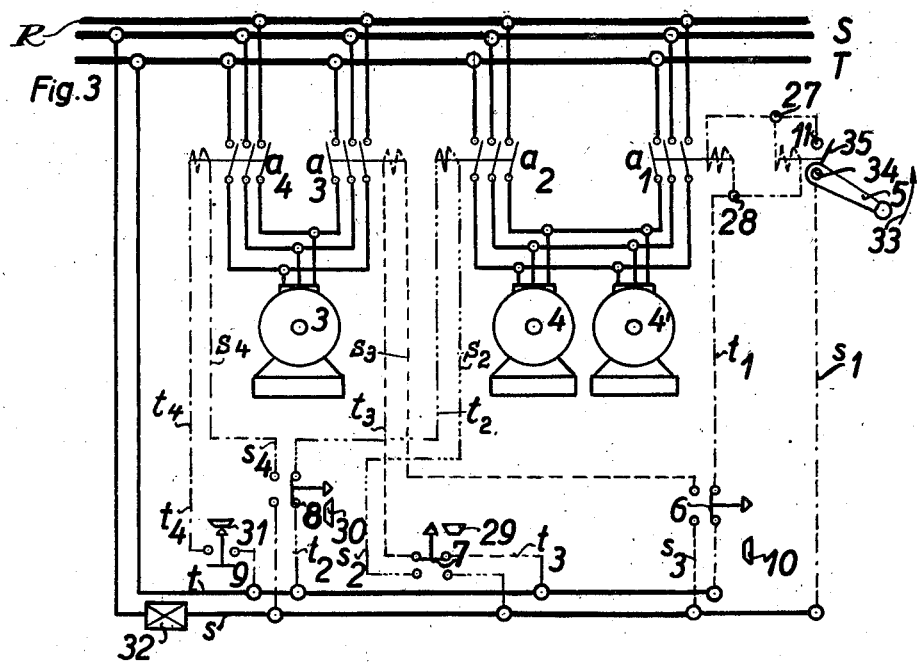
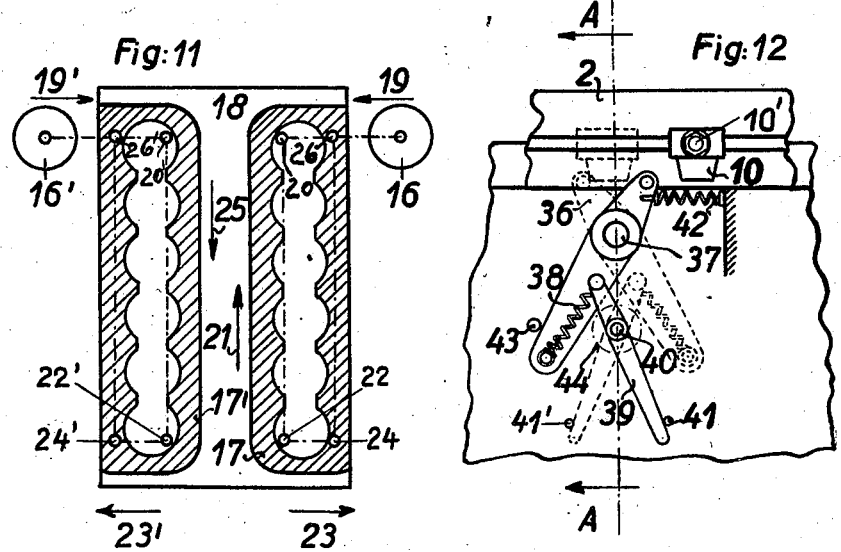
Inventor: Max Saupe
by Karl Viertel
Attorney

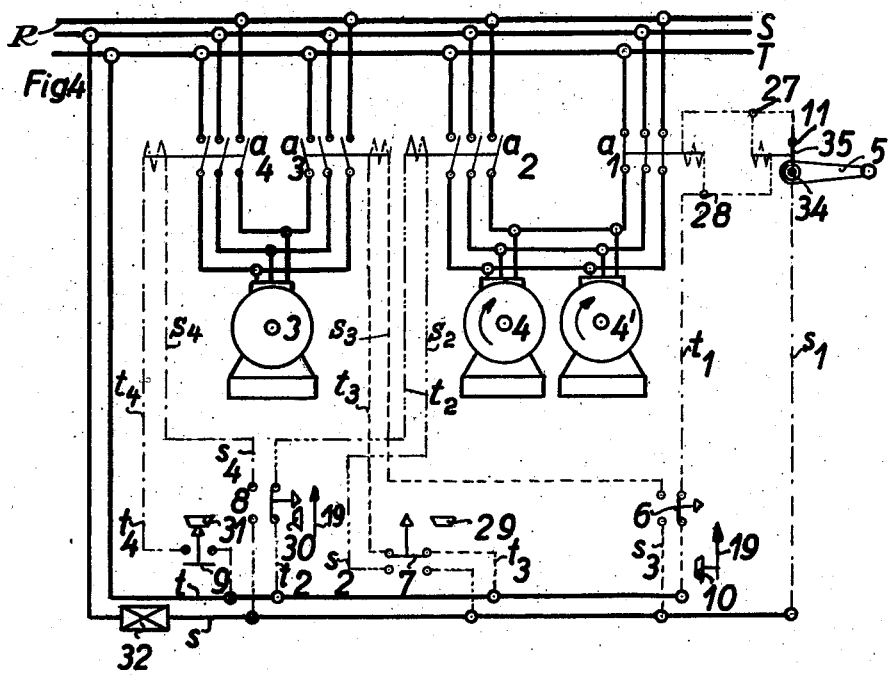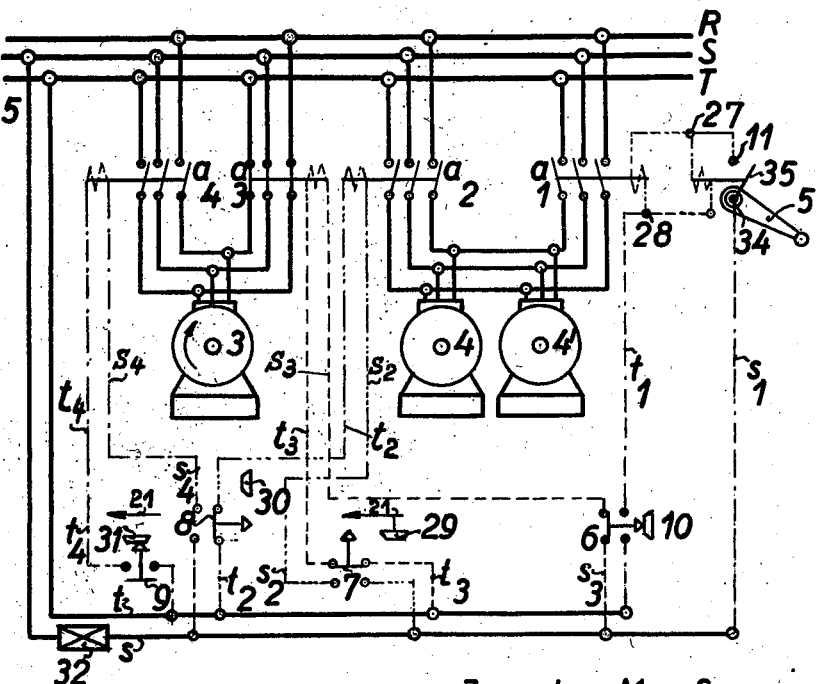

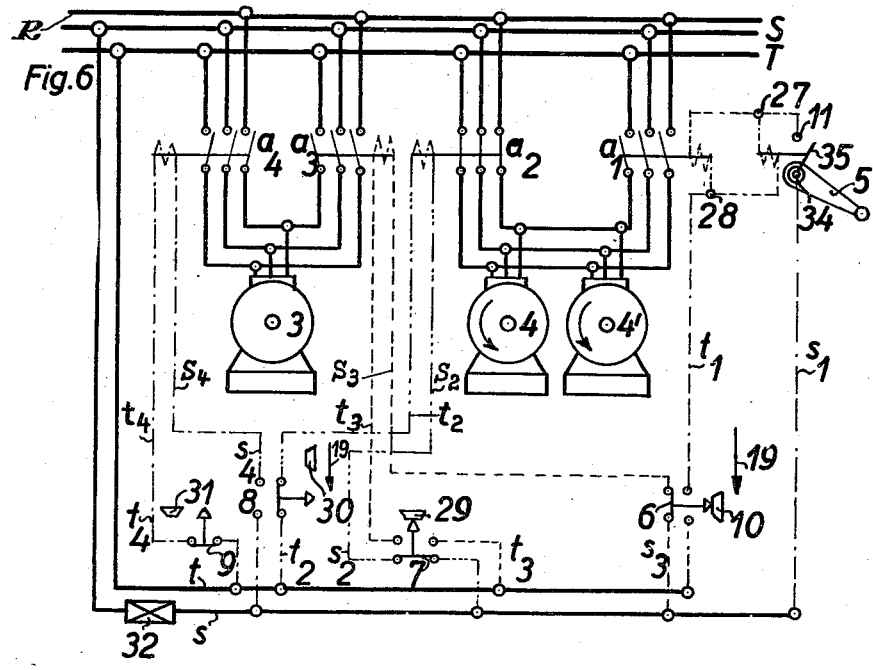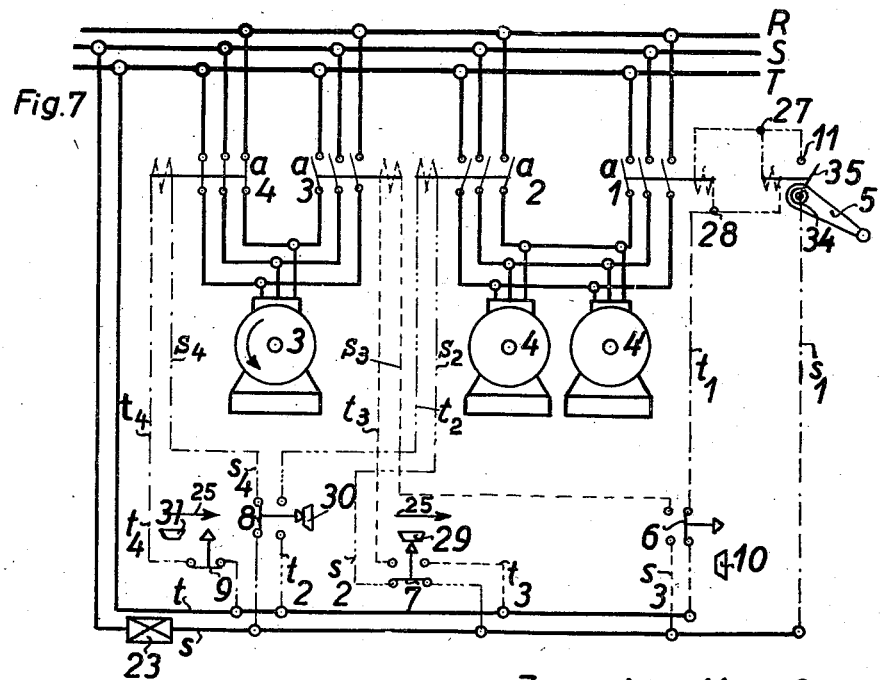

March 7, 1939.  M. SAUPE  2,149,791

MACHINE TOOL

Filed Aug. 6, 1937  6 Sheets-Sheet 5

Inventor: Max Saupe
by Karl Viertel
Attorney

March 7, 1939.    M. SAUPE    2,149,791
MACHINE TOOL
Filed Aug. 6, 1937    6 Sheets-Sheet 6

Inventor: Max Saupe
by Karl Viertel
Attorney

Patented Mar. 7, 1939

2,149,791

UNITED STATES PATENT OFFICE 2,149,791

MACHINE TOOL

Max Saupe, Chemnitz, Germany, assignor to J. E. Reinecker, Aktien-Gesellschaft, Chemnitz, Germany Application August 6, 1937, Serial No. 157,763
In Germany August 7, 1936

2 Claims. (Cl. 90—15)

My invention relates to milling machines and machine tools of kindred classes, in which machining operations of various kinds, including cutting, slotting, grinding, abrading, polishing and so on are performed by rotary tools, and in which the piece of work, fixed on the machine table, and the rotary tool concerned are cooperatively associated by two feeding devices adapted to feed them in lengthwise and crosswise direction relatively to each other.

The invention relates more particularly to improvements in machine tools classified as above, with which—in addition to the ordinary and conventional kind of machining work—"four corner work" as it is briefly called hereinafter can be done to advantage namely the machining for instance of a four cornered flange of a casting of rectangular cross sectional shape in a closed cycle of operations, or of other pieces of work presenting four cornered portions.

The various objects of this invention and the advantages obtained will be better understood by first reviewing the principal features of machine tools known in the trade, which are adapted for "four corner work".

There is a special type of milling machines known which are provided with but one single feed motor and two sets of mechanical power transmission devices under the operator's control, including releasable couplings, reversing gears, universal joints, connecting shafts and so on for alternately coupling and uncoupling the feed motor and the respective feeding devices for lengthwise and crosswise feed and for timely reversing the working direction of the latter.

With another type of milling machines designed for four corner work there are two electric feed motors provided, one for the lengthwise feed and the other one for the cross feeding operation, and also a system of electric switches under the operator's control for alternately connecting the feed motors with the electric power circuit and for reversing their direction of rotation.

As a matter of fact known to practitioners both types of milling machines offer considerable difficulties as to their operation and supervision in as much as it calls for great skill, dexterity and the closest attention on the part of the operator to perform the various coupling, uncoupling, switching and reversing operations at the respective corners of the piece of work without delay and in the shortest possible manner. In practice it is particularly difficult for the operator to so speedily control the various feeding operations, that they follow each other instantaneously, in proper sequence and direction, and that relative movements of the rotary tool and of the piece of work, likely to occur at the corners in lengthwise and crosswise direction simultaneously, are avoided.

To wit: By delaying one of the switching operations and working overtime at a corner of the work piece under treatment the rotary tool, for instance a milling cutter, will make a deeper cut than at other places which is objectionable; while by feeding the cutter simultaneously in both directions temporarily at the corners bevelled edges or rounded corners instead of sharp ones are produced, as indicated in dotted lines at $i$, $i'$ in Fig. 9, which is an equally objectionable feature.

In his attempts to overcome the above described difficulties and with the object of providing a wholly automatic machine tool for four corner work the inventor first resorted to two separate electric feed motors for lengthwise and cross feed and to a system of time switches, cooperatively connected through electromagnetic multiple way switches with the electric feed motors and the main power circuit.

Said system of time and electromagnetic switches however, proved to be unreliable in practice, namely, too complicated electromechanically, rather expensive and too difficult to be supervised and kept in proper working order by an operator of average skill.

The principal object of this invention is to overcome the various drawbacks and disadvantages inherent to known machine tools of the types described by providing an improved electrically operated machine tool for four corner work, which is simple and inexpensive as to its electrical switching equipment, and which is automatic in its action to such an extent, that a single operator of ordinary skill can attend to and supervise simultaneously several machines re-designed according to this invention.

One of the most salient features of the invention consists in the provision of selfacting electric switching means, so designed and controlling the feeding movements, that the different sections of travel of the rotary tool, briefly called "strokes" in length wise and crosswise direction relatively to the piece of work will positively and instantaneously—namely without delay at the corner points follow each other and so, that any irregular feeding movements, resulting from lengthwise and crosswise feeding simultaneously, are strictly avoided.

Other objects aimed at by the invention and advantages obtained will become apparent to experts in this field in the course of the following description.

The nature and scope of the invention are briefly outlined in the appended claims, and will be more fully understood from the following specification taken together with the accompanying drawings, in which—

Figs. 1 and 2 are front and side elevations respectively of a horizontal milling machine, redesigned according to this invention and shown by way of an example, Figs. 3 to 8 are lay-outs diagrammatically showing the electric feed motors of a plano milling machine, re-designed according to this invention, their connections with the main power circuit and the switches cooperatively interassociated with the table and tool supports of the machine.

Figs. 9 and 10 are a plan and side view respectively showing a four cornered piece of work, having a lower and upper section, and the path of travel to be taken by a rotary milling cutter along said piece of work according to this invention, Fig. 11 is a plan showing a cylinder block of a Diesel engine, of which the upper surfaces, marked by hatched lines, are to be simultaneously subjected to grinding, milling or other operations on a machine tool re-designed according to this invention, Fig. 12 is a front elevation showing in a larger scale one of those spring loaded two way switches used in connection with machine tools improved according to this invention, and their cooperation with a striker dog adjustably fixed at the table or tool support of the machine.

Figure 1:
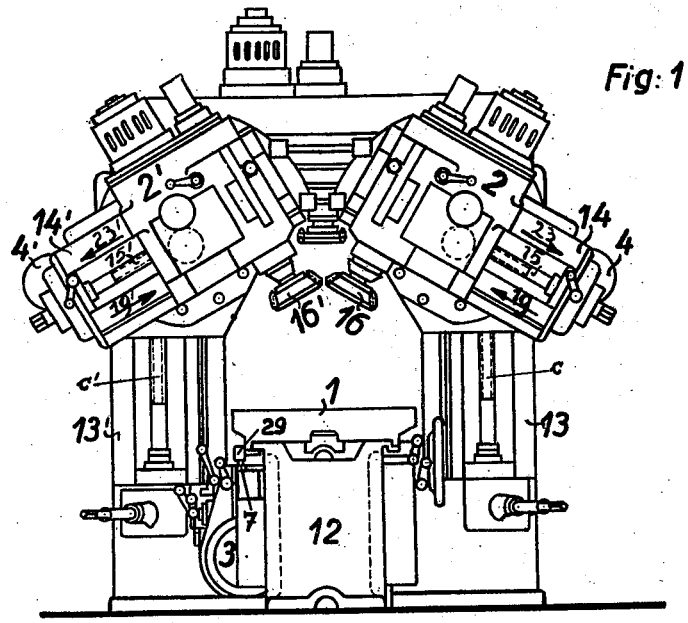
Figure 2:
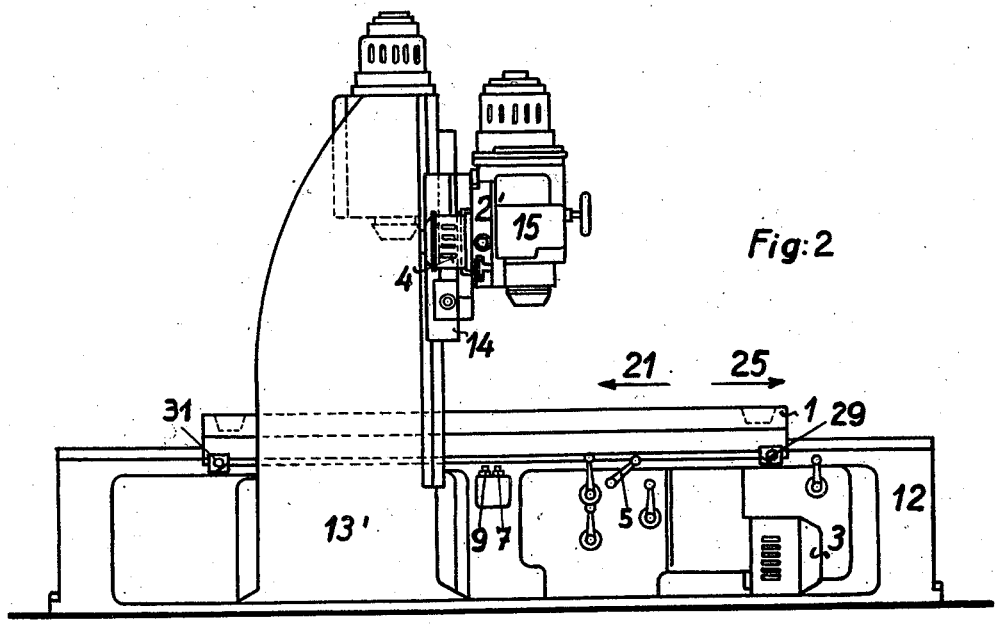

The milling machine shown in Figs. 1 and 2 and redesigned according to this invention is of the double horizontal or plano type and comprises:

(a) A work table 1 slidably mounted on the machine bed 12 for being reciprocated in lengthwise direction by a conventional feeding device, not shown, and a reversible electric motor indicated at 3, (b) Two columns 13, 13', on which cross rails 14, 14', supporting the tool carriers 2, 2' are slidably and adjustably mounted by means of screw spindles c, c', (c) Two reversible electric motors 4, 4' for operating the crosswisely acting feeding devices, indicated at 15, 15', (d) Rotary milling cutters 16, 16', individually driven by separate electric motors through conventional power transmission gears not shown.

Figure 9:
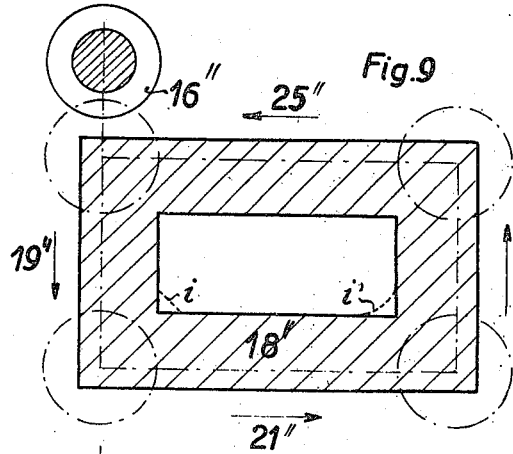
Figure 10:
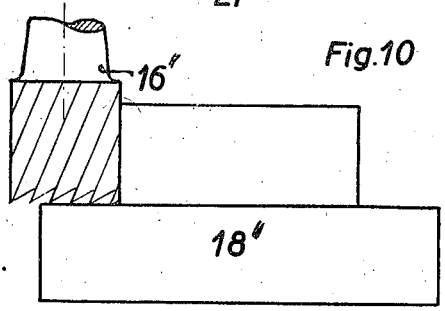

With the objects in view stated hereinbefore the above described milling machine is equipped according to this invention with an automatic switching and multiple circuit control mechanism, so designed that for instance the four cornered upper faces 17, 17' of a cylinder block 18 marked by hatched lines in Fig. 11 or the likewise marked faces of a piece of work 18" shown in Figs. 9 and 10 can be milled or otherwise machined in closed cycles of operations.

To wit: Once the cylinder block 18 has been fixed on the machine table and the striker dogs 10, 29, 30, 31 have been accurately set for timely cooperation with the switches 6, 7, 8, 9, as described hereinafter in detail with reference to Figs. 3 to 8, and after the machine has been started to run by the attendant, the milling cutters 16, 16' will proceed on their cross wise travel in the direction of the arrows 19, 19'; on reaching the turning points 20, 20', while the cross feed is stopped, the lengthwise motion of the table 1 in the direction of arrow 21 sets in; on reaching the turning points 22, 22', the said lengthwise motion is stopped, while the cross feeding motion of the milling cutters 16, 16' is restarted but in the reverse direction indicated by arrows 23, 23' until reaching the turning points 24, 24'; thereupon the table 1 alone will proceed in the direction of the arrows 25, 25', until the points 26, 26' have been reached by the milling cutters 16, 16', where the machine is completely stopped by the cooperation of dog 31 and switch 9 as described hereinafter with reference to Fig. 8.

In Figs. 9 and 10 another four cornered piece of work 18" is shown, which is to be worked upon by a milling cutter 16" of a different type, and by which the hatched horizontal surface and the vertical walls of the central portion are milled simultaneously and in a closed cycle of operations indicated by the arrows 19", 21", 23", 25".

In the embodiment of the invention, diagrammatically shown in Figs. 3 to 8 the electric switching and multiple current controlling mechanism for automatically controlling the operation of the lengthwise and crosswisely acting feeding devices of the machine, comprises:

(1) A primary set of master switches $a_1$, $a_2$, which are electromagnetically operated and interconnected with the main power circuit R, S, T and the motors 4, 4' operating the crossfeeding devices 15, 15' in such manner, that with the switch $a_1$ closed, as seen in Fig. 4, the said motors will run in clockwise direction, while with the switch $a_2$ closed their direction of rotation is reversed namely anticlockwise as seen in Fig. 6, (2) A secondary set of master switches $a_3$, $a_4$, which are electromagnetically operated and interconnected with the main power circuit R, S, T and motor 3 operating the lengthwise acting feeding device for the table 1 in such manner, that with the switch $a_3$ closed, as seen in Fig. 5, the motor will run in clockwise direction, while with the switch $a_4$ closed, as seen in Fig. 7, motor 3 will be reversed and run in anticlockwise direction, (3) Shunt circuits $s_1$—$t_1$, $s_2$—$t_2$, $s_3$—$t_3$, $s_4$—$t_4$ energizing the magnets of said master switches $a_1$, $a_2$, $a_3$, $a_4$, (4) Two-way switches 6, 7, 8 having contact makers, for successively making and breaking said shunt circuits: Switch 6 while being retained in its normal position by a spring (not shown) closes the circuit $s_1$—$t_1$ (Figs. 3, 4, 7 and 8) and will in turn close the shunt circuit $s_3$—$t_3$ on being pushed aside by the striker dog 10 adjustably fixed by a clamping screw 10' on the tool carrier 2 (Fig. 12); switch 7, while being retained in its normal position by a spring (not shown) closes the circuit $s_3$—$t_3$ (Figs. 3, 4 and 8) and will in turn close circuit $s_2$—$t_2$ on being pushed aside by the striker dog 29 (Figs. 6 and 7);

Switch 8, while being retained in its normal position by a spring (not shown) closes the shunt circuit $s_2$—$t_2$ (Figs. 3, 4, 5 and 6) and will close circuit $s_4$—$t_4$ on being pushed aside by the striker dog 30 (Figs. 7 and 8), (5) A single-way switch of conventional design having a contact maker 9, which while being retained in its operative position by a spring (not shown) closes the circuit $s_4$—$t_4$ (Figs. 6 and 7) and will open the latter on being pushed aside by the striker dog 31 (Figs. 3, 4, 5 and 8), (6) A manually operated primary switch for starting the machine, which comprises a handle 5 fulcrumed at 34, a contact maker 35 for co-operation with contact plate 11, and an electromagnet, the armature o of which (Fig. 8) is hinged to the contact maker 35; on closing the circuit $s_1$—$t_1$ at 11 (Fig. 4) electromagnet o is energized by an auxiliary circuit, indicated at 27, 28, and will retain the primary switch in its operative position until the primary shunt circuit $s_1$—$t_1$ is broken at 6 by the striker dog 10 (Fig. 5), (7) Another master switch diagrammatically indicated at 32, which may be provided to advantage for closing and breaking the circuit at the operator's discretion in the branch conductor s.

The operation of the machine is as follows:

After the piece of work has been fixed on the machine table 1, the striker dogs 29, 31 for the lengthwise feed control and when the dogs 10, 30 for the cross feed control are accurately set into their proper position with regard to the length and width of the four cornered faces to be machined, the machine is ready for work, the various parts of the electric switching mechanism being then in the position shown in Fig. 3.

On turning the handle 5 of the primary switch in the direction of arrow 33 the shunt circuit $s_1$—$t_1$ is closed at 11 (Fig. 4), and the motors 4, 4' will now start to run in clockwise direction so as to feed the milling cutters 16, 16' in the direction of the arrows 19, 19' (Figs. 1 and 11), until reaching the corner points 20, 20'; at this juncture the contact maker 6 is thrown aside by the striker dog 10, (Fig. 5) with the result that the shunt circuit $s_1$—$t_1$ is broken, while concurrently the shunt circuit $s_3$—$t_3$ is closed; motor 3 actuating the lengthwise feeding device of the machine will thereupon start running and feed the machine table 1 in the direction of arrow 21 until reaching the next following corner points 22, 22'; at this moment the contact maker 7 is thrown aside by the dog 29 (Fig. 6) with the result, that circuit $s_3$—$t_3$ is broken, while circuit $s_2$—$t_2$ is closed; the motors 4, 4' actuating the crossfeeding devices will thereupon resume their work but now running in anticlockwise direction (Fig. 7), since their poles and connections with the main conductors R, S, T have been changed by the master switch $a_2$; on reaching the next following corner points 24, 24' the second crosswise travel of the tools 16, 16' in the direction of arrows 23, 23' is abruptly stopped, while the machine table 1 starts on its second lengthwise travel in the direction of arrow 25 namely by the cooperation of the two-way switch 8 and the dog 30 (Fig. 7), whereby circuit $s_2$—$t_2$ is broken, while circuit $s_4$—$t_4$ is concurrently closed.

Figure 8:
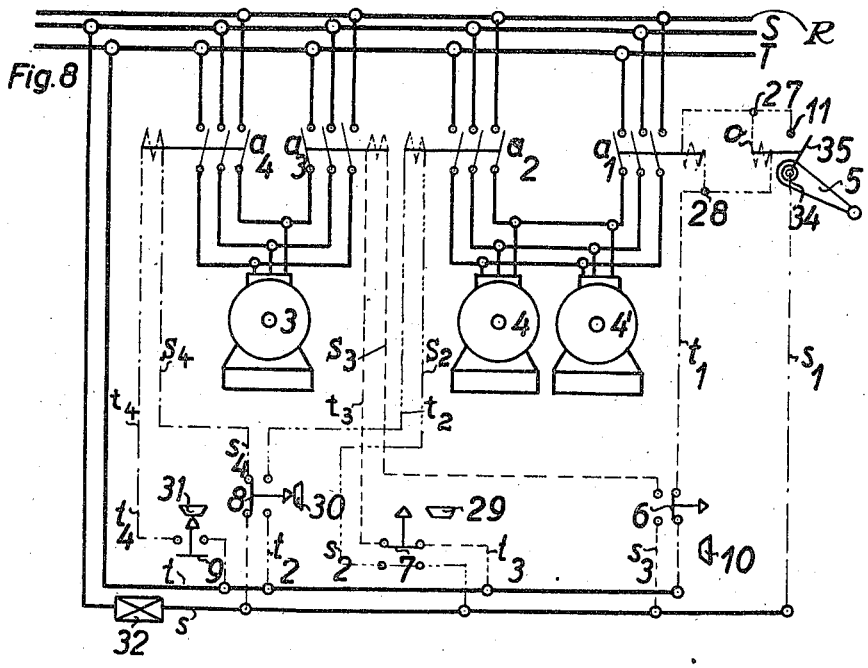

On reaching the turning points 26, 26' the machine is automatically stopped by the interengagement of dog 31 and the single way switch 9, as shown in Fig. 8, but may be restarted repeatedly for the same cycle of operations by throwing the primary switch 5, 35 again into its operative position (Fig. 4).

Figure 13:
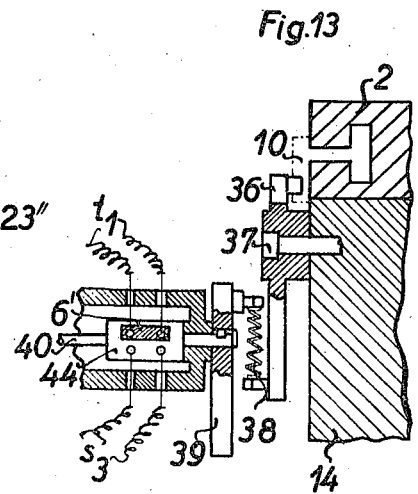
Fig. 13 is a section on line A—A in Fig. 12.

Good results have been obtained with two-way switches of the quick action type comprising:

(a) A roller 44 (Figs. 12 and 13) keyed to a rotary shaft 40 and having a contact plate 6' fixed thereon for cooperation with the terminals of the conductors $s_3$ and $t_1$;

(b) A double armed lever 39 keyed to shaft 40 and capable of being rapidly swung into its operative positions, defined by stops 41, 41', by means of a spring 38, which is fixed to (c) Another double armed lever 36 fulcrumed at 37 and loaded by another spring 42; a stop 43 is provided for arresting said lever 39 in its operative position ready for engagement by the striker dog 10, as shown in Fig. 12, which is otherwise selfexplanatory.

Various changes and modifications may be conveniently made in the structural details of machine tools equipped with the improved electric switching and circuit controlling system described, without departing from the spirit and the salient ideas of this invention.

Obviously the invention is not restricted to milling machines of the horizontal type shown in Figs. 1 and 2 but applicable to machine tools of various classes, where instead of milling cutters other rotary tools for grinding, abrading, slotting, polishing and like machining operations are employed, and where two feeding devices are provided for feeding the piece of work and the rotary tool in lengthwise and crosswise direction relatively to each other.

Figure 15:
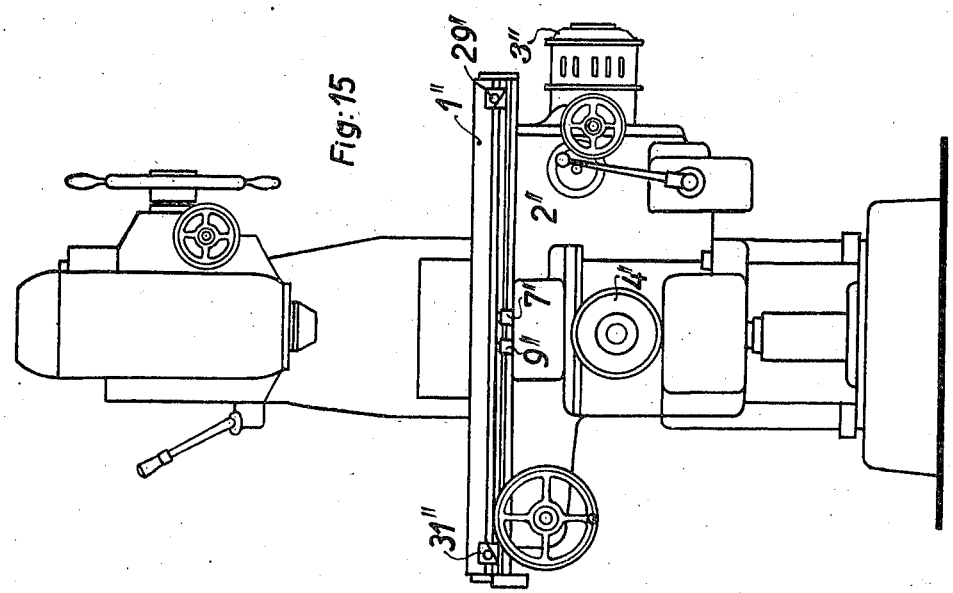
Figs. 14 and 15 are side and front elevations respectively of a milling machine of the column and knee type, re-designed according to this invention and shown as another example.
Figure 14:
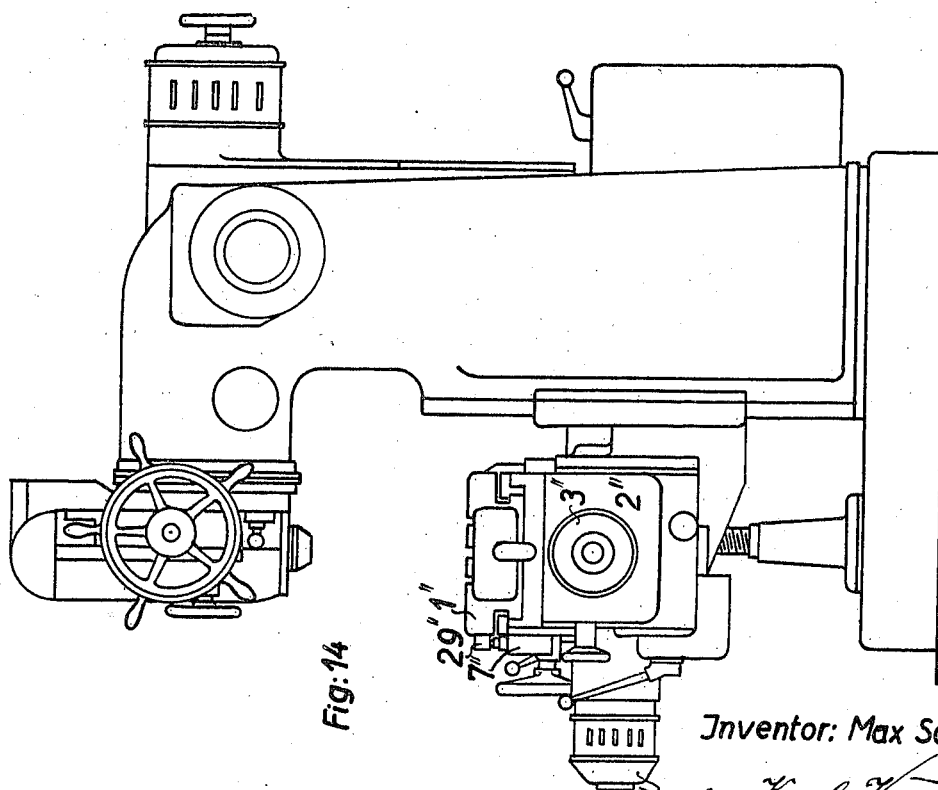

Figs. 14 and 15 show by way of another example a universal milling machine of the column and knee type, the work table 1'' of which can be fed in lengthwise and crosswise direction, and which is provided with two separate electric motors 3'', 4'' for lengthwise and cross feed and with an automatic multiple circuit controlling system designed according to this invention: One of the two-way switches, the single way switch described above and the striker dogs cooperating therewith for controlling the lengthwise feeding operation of the table 1'' being diagrammatically indicated at 7'', 9'', 29'', 31'', while the other two-way switches and their striker dogs designated 6, 8, 10, 30 in Figs. 3–8 and not shown in Figs. 14 and 15, are cooperatively associated with the cross feeding device of the table 1'', which is operated by motor 4''.

What I claim is:

1. In a milling machine, the combination with a reciprocable work table, of a tool support, reciprocable at right angles to the work table, and electrically operated feeding means for effecting a four cornered relative movement therebetween, namely a closed cycle of four consecutive milling operations at right angles to each other,— said electrically operated feeding means being energized from a main circuit of alternating current and comprising two reversible electric feed motors for individually operating the feeding devices of the work table and the tool support respectively and self-acting switching means for alternately and consecutively starting, stopping and reversing said feed motors in response to the lengthwise and crosswise feeding movements of the work table and tool support relatively to each other.

2. In a milling machine, the combination with a reciprocable work table, of a tool support, reciprocable at right angles to the work table, and electrically operated feeding means for effecting a four cornered relative movement therebetween, namely a closed cycle of four consecutive milling operations at right angles to each other, said electrically operated feeding means being energized from a main circuit of alternating current and comprising two reversible electric feed motors for individually operating the feeding devices of the work table and the tool support respectively, and self-acting switching means for alternately and consecutively starting, stopping and reversing said feed motors in response to the lengthwise and crosswise feeding movements of the work table and tool support relatively to each other, said switching means comprising two sets of electromagnetic master switches for selectively connecting the said feed motors with a main power circuit, four shunt circuits for energizing the magnets of said master switches, three two-way switches and a single-way switch for making and breaking said shunt circuits, striker dogs for successively actuating said two-way and single-way switches in a closed cycle of operations, and a primary switch under the operator's control for closing the first one of said shunt circuits and starting the first milling operation.

MAX SAUPE.